Figure 1:
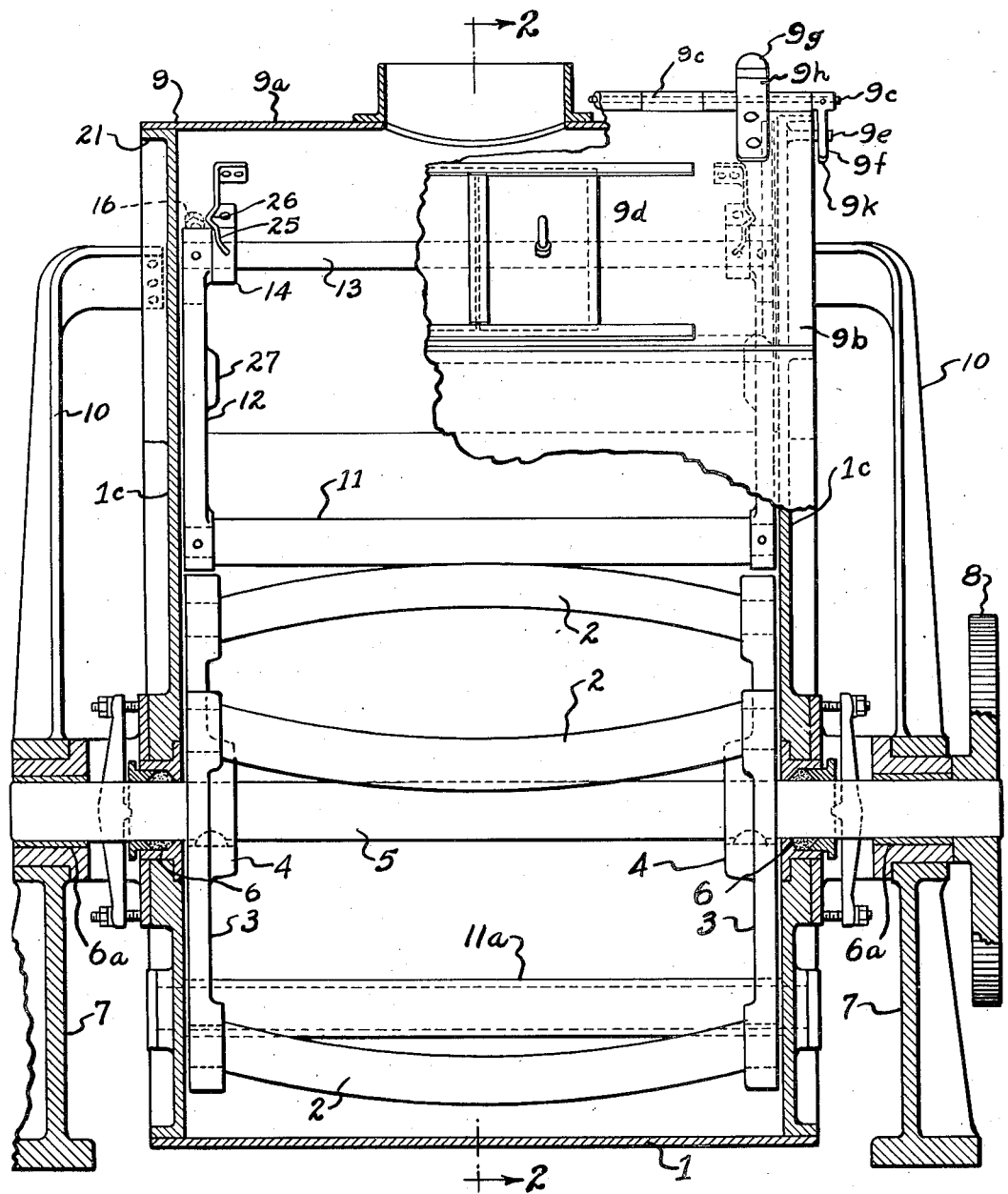

Dec. 24, 1935.  E. J. LAUTERBUR  2,025,541
DOUGH MIXER
Filed March 15, 1934  2 Sheets-Sheet 1

INVENTOR.
Edward J. Lauterbur
BY
Allen + Allen
ATTORNEYS.

Patented Dec. 24, 1935

2,025,541

UNITED STATES PATENT OFFICE 2,025,541

DOUGH MIXER

Edward J. Lauterbur, Sidney, Ohio

Application March 15, 1934, Serial No. 715,653

14 Claims. (Cl. 259—109)

My invention relates to dough mixers of the type in which there is a bowl with an agitator therein for mixing the dough, and which bowl is tiltable, usually on the axis of rotation of the agitator, to discharge the completed mix; and in which suitable braking means is provided in the bowl along the path of action of the agitator, to retard the dough materials and thereby attain a thorough action of the agitator thereon.

The bowl of such a mixer usually is provided with a lid or cover; and in prior constructions this cover has been mounted on the bowl for opening and closing movement and swings with the bowl when the bowl is tilted.

It is an object of my invention to provide for tilting the bowl to and from the cover. This permits the cover to be mounted in fixed position; and it may be connected directly to means that discharges the materials into the bowl for mixing.

A further object is to provide for mounting the braking means on the inside of the cover and to so arrange the parts that the braking means may extend into the bowl in the required proximity to the path of travel of the agitator, but may be moved into a position wherein it will not interfere with the tilting of the bowl relative to the cover when the contents are to be discharged from the bowl.

A further object of my invention is to have the rim of the bowl make a specially effective closing contact or abutment with the corresponding portions of the cover when the bowl is tilted into position for normal operation.

A further object is to cause the bowl in the act of tilting away from the cover to move the braking means out of its normal operating position into the position wherein it does not interfere with the tilting of the bowl as above mentioned.

A further object is to provide such a movable brake means with means whereby its position may be adjusted relative to the path of travel of the agitator; preferably effecting this adjustment by virtue of the same movement that the braking means has when it is moved out of the way of the bowl as above described.

It is a further object to have the braking means moved out of the way in the above manner, and to have it assume its operative position automatically when the bowl is returned to normal operative position, preferably effecting this return by the action of gravity; and to have the braking means when thus in its normal position, so supported and so presented relative to the direction of movement of the agitator that the coaction between the agitator and the braking means tends to maintain the braking means in its operative position; and when the adjusting means is provided to have this means so arranged at any adjustment so that maintenance of the operative position of the braking means will be had as above described.

Other objects will appear in the course of the following description illustrated by the accompanying drawings, in which Figure 1 is a front elevation of a mixer embodying my invention.

Figure 2:
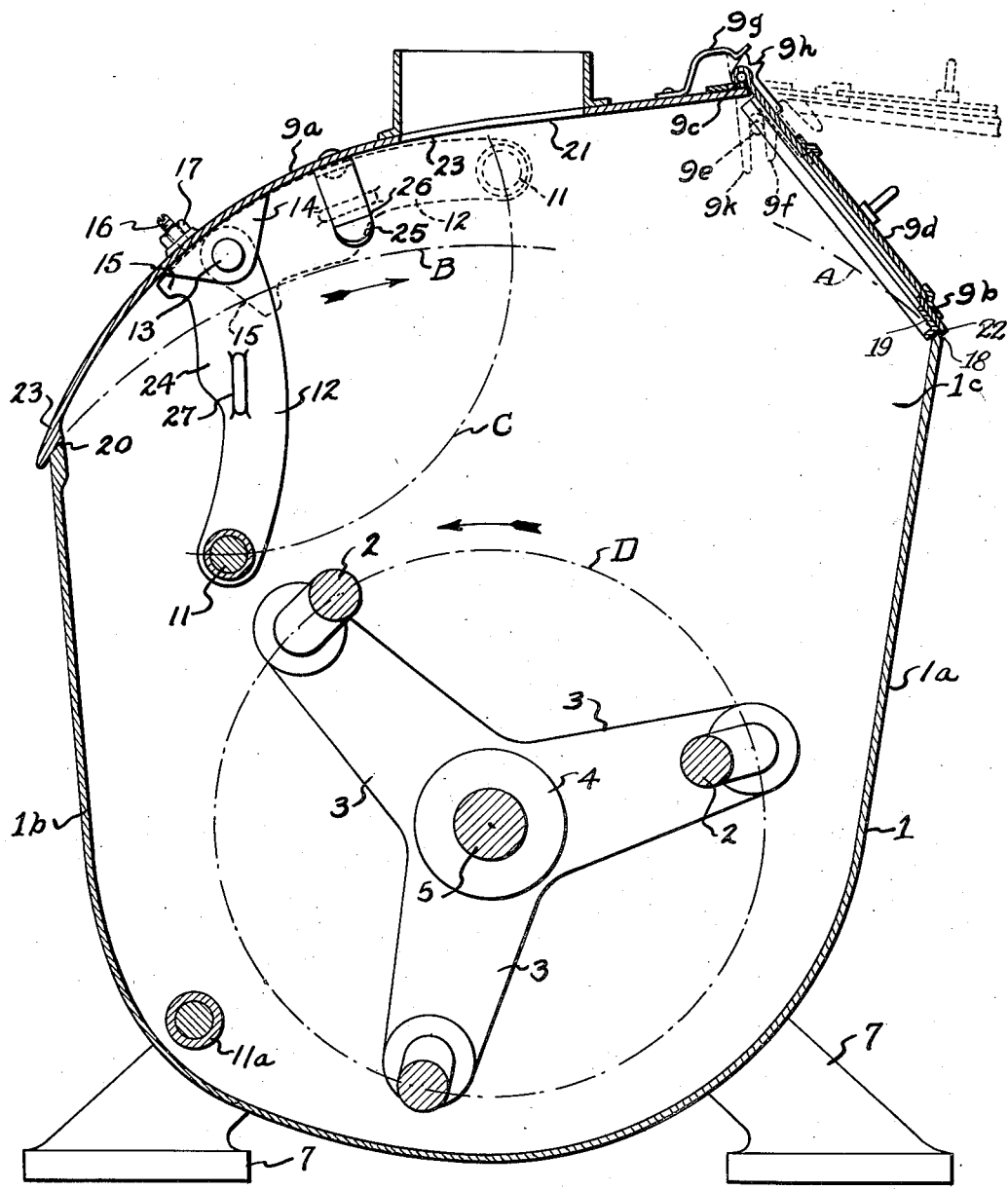

Fig. 2 is a front to rear vertical section on the line 2—2 of Fig. 1.

The dough mixer illustrated as a preferred example of the invention comprises a bowl 1, with an upwardly curved bottom, up from which extends a front wall 1a and a rear wall 1b, preferably somewhat diverging in their upward extent; and having lateral walls 1c, conforming to the bottom and front and rear walls. This is a usual construction of a dough mixer bowl; and also as is usual in such dough mixers an agitator made up of a number of transverse bars 2 fixed in and extending from one to the other of two sets of arms 3, rotating from a hub 4, is mounted by means of this hub on a shaft 5, which extends out through the lateral walls 1c of the bowl and has packed bearings 6 in these walls. These bearings have extensions pivoting in supports 7, at 6a, so that, as is usual in such dough mixers, the bowl 1 may tilt forwardly. Some means for rotating this agitator is provided; and this is represented herein by a gear 8 fixed on an extension of the shaft 5 outside one of the supports 7.

Instead of having the lid or cover 9 hinged or otherwise movably connected to the bowl rim for opening and closing, I provide a stationary support for this cover 9. As here shown suitable supporting arms 10 extend up from the supports 9 and are connected to the lateral edge parts of the cover 9.

So that the bowl may be swung freely forwardly on its pivotal mountings in the supports 7 without hindrance by the cover 9, and so that when the bowl is swung back to its normal operating position, it may make efficient closing contact with the under side of the cover 9, I provide both the bowl and the cover with a certain novel shaping and proportioning of parts. Thus the cover 9 is made of a curved shape such that its front portion is almost straight and horizontal; but the rear portion curves more abruptly downwardly and rearwardly from the front portion.

As here shown, the cover 9 is made with a main section 9a, a section 9b hinged at 9c to the front edge of the section 9a and slanting down and forwardly therefrom; the bowl 1 being shaped, at its front wall 1a and its side walls 1c, accordingly, so that this front section 9b closes the front of the bowl 1. It preferably has sliding panels 9b which when opened allow the operation within the bowl to be inspected without bringing this section 9b to an open position.

As the bowl is tilted forwardly pins 9c near the upper corners of the side walls 1c, engaging the forward members 9f of forks, portions of the cover section 9b, between the front and rear members of the forks, complete the raising of the section; whereupon spring latches 9g mounted on the main cover section 9a at opposite sides snap onto respective lugs 9h fixed on the adjacent parts of the cover section 9b, holding this cover section up while the bowl carries the pins 9e forward past the fork members 9f. The cover section 9b now has longer rear fork members 9k down within the paths of the respective bowl pins 9e, to be engaged thereby upon return tilting of the bowl, whereby the pins 9e regain their positions between the fork members and the cover section 9b is swung down and disengages its lugs 9h from the latches 9g, to fall toward closed or normal position gradually under control of the forks, which position it reaches as the upper corners of the bowl sides recede from it.

The front section 9b and associated parts above described are not to be understood as being essential to my invention, as, if desired, it may be omitted, in which case the cover would extend substantially horizontally forward and the front bowl wall would extend up to engage it.

The braking means as also is usual in mixers of this type, comprises bars 11 and 11a, supported to extend across the inside of the bowl close to the circle of rotation of the agitator bars 2. The bar 11a is close to the bottom of the bowl near the rear; and the bar 11 is near the rear but close to the top of the circle of rotation of the agitator. These mixers frequently are provided with additional bars or other means having the similar function of retarding the dough as it is carried around by the agitator bars 2, and thereby promoting the mixing.

My invention is concerned with the bar 11 which is nearer the top of the bowl. Instead of mounting this bar 11 on the bowl structure, where it would interfere with the discharge of contents from the bowl when the bowl is tilted, I mount it on the cover 9 and provide for so moving it that it will not interfere with the tilting of the bowl relative to the cover. As here shown, this bar 11 extends across from one to the other of two support arms 12. When the bar 11 is in normal operative position, these arms 12 extend downwardly and the bar 11 is supported by their lower end portions. The upper end portions of these bars 12 are pivoted on a shaft 13 that extends transversely and is mounted in bearing projections 14 on the under surface of the cover 9 within the more abruptly curved part thereof above described.

Lugs 15 project from the portions of the arms 12 near the pivot 13, being arranged so that they project rearwardly close to the under surface of the curve 9, when the arms and the bar 11 are swung down in operative position. Threaded through the cover 9 are abutments or stop screws 16, locked by means of lock nuts 17. These screws 16 are abutted by the lugs 15 to stop the downward and rearward swinging of the bar 11 and its supports 12, at such position as it is desired that the bar 11 should have for correct coaction with the agitator.

The front rim 18 of the bowl wedges against an angle bar 19 on cover 9b, and the rear rim 20 is preferably beveled downwardly and rearwardly. The rims 21 of the side wall 1c are curved to closely abut the curved cover 9.

The front and rear bowl rims 18 and 20 swing along arcs A and B, so that the bowl and cover have a mutual wedging bowl closing action at 22 and at 23, and all along where the side rims 21 abut the cover.

Each one of the arms 12 has a rearwardly projected portion 24 engaged by the rear rim 20, up close to the pivotal mounting of the arms, as the bowl swings forwardly, so that the arms 12 and bar 11 are swung up close to the cover 9 as indicated by the dotted lines in Fig. 2. Resilient latch members 25 are fixed to and depend from the under side of the cover 9, each with a V-shaped bend 26 extending into the paths of ribs 27 on the sides of the respective arms 12. As the arms approach their upward position, the ribs 27 engage the lower slanting sides of the bends 26, springing the members 25 outward; and then, as the arms complete their rise, these members 25 spring in again, until, when the rear rim 20 of the bowl has passed forward off the arm portions 24, the arms are held up by the engagement of the arm ribs 27 with the upper slanted sides of the bends 26, while the bowl is completely tilted forward, usually through an angle of about ninety degrees.

The arm lugs 15 now are down in the path B of the rear bowl wall 20, and when the bowl is tilted back again, the wall 20 will engage these lugs 15, pulling the arms 12 and bar 11 down; the ribs 27 now acting on the upper slanted sides of the bends 26 to spring the members 25 aside. The arms 12 and bar 11 now will swing down by gravity, raising the lugs 15 out of path B. When these lugs 15 again engage the stop screws 16, the arms 12 and bar 11 stop, again in operative position.

By setting the screws 16 more or less inward, the braking means may be stopped with the bar 11 more or less forward; so that by the swinging movement permitted the braking means, two functions are performed, one the removal of the braking means out of the way of the bowl for tilting the bowl, and the other the adjustment of this braking means more or less closely to the path of rotation of the agitator bars 2.

I am enabled to provide a simpler arrangement of the bowl and its cover for effecting automatic opening as the bowl is tilted, than where the cover is hinged to the bowl. By permitting the cover to be mounted in a fixed position the connection to the bowl from stationary apparatus is simplified. The braking means is provided with just as much efficiency and with even simpler adjustment than is afforded by some prior constructions. The agitator rotates over backwardly in the direction of the large arrow, and so forces the materials against the bar 11, tending to keep this braking means, back in proper position relative to the agitator. A further advantage over prior structures is the provision of the braking means to remain with the cover and be removed out of position where it could obstruct discharge of contents from the bowl. I therefore provide a much more freely discharging mixture than the structures heretofore provided.

It will be understood that various modifications may occur in practice in accordance with conditions arising or the preference of users, and that while I have somewhat specifically illustrated and described a preferred construction, I am not limited to such precise disclosure, but that I claim as new and desire to secure by Letters Patent is:

1. In a dough mixer, a relatively tiltable bowl and cover, an agitator in the bowl, and braking means, a mounting on the cover, on which said braking means is movable to have an operative position relative to the agitator, in which position it extends across the path of relative tilting movement of a portion of the bowl rim, said mounting being so located on the cover that said braking means is adapted to be moved out of said path by engagement of said relatively tilting rim portion with said braking means.

2. In a dough mixer, a relatively tiltable bowl and cover, an agitator in the bowl, braking means, a mounting on the cover, on which said braking means is movable to have an operative position relative to the agitator, in which position it extends across the path of relative tilting movement of a portion of the bowl rim, said mounting being so located on the cover that said braking means is adapted to be moved out of said path by engagement of said relatively tilting rim portion with said braking means and means for holding said braking means in different operative positions relative to the agitator.

3. In a dough mixer, a relatively tiltable bowl and cover, an agitator in the bowl, braking means, a mounting on the cover, on which said braking means is movable to have an operative position relative to the agitator, in which position it extends across the path of relative tilting movement of a portion of the bowl rim, said mounting being so located on the cover that said braking means is adapted to be moved out of said path by engagement of said relatively tilting rim portion with said braking means, and means for holding said braking means at different stages of said movement, in different operative positions relative to the agitator.

4. In a dough mixer, a relatively tiltable bowl and cover, an agitator in the bowl, said cover having a recess out of the paths of relative movement of bowl rim portions and the cover, and braking means movable on the cover into position for coaction with the agitator within said paths of relative movement, or into said recess for the relative tilting of the bowl and cover.

5. In a dough mixer, a relatively tiltable bowl and cover, an agitator in the bowl, said cover having a recess out of the paths of relative movement of bowl rim portions and the cover, and braking means mounted to move on the cover under action of gravity into position for coaction with the agitator within said paths of relative movement, or to be moved, by engagement of a portion of the bowl with said braking means, into said recess for the relative tilting of the bowl and cover.

6. In a dough mixer, a relatively tiltable bowl and cover, an agitator in the bowl, said cover having a recess out of the paths of relative movement of bowl rim portions and the cover, and braking means pivotally connected to said cover to swing on the cover under action of gravity into position for coaction with the agitator within said paths of relative movement, or to be swung, by engagement of a portion of the bowl with said braking means, into said recess for the relative tilting of the bowl and cover.

7. In a dough mixer, a relatively tiltable bowl and cover, an agitator in the bowl, said cover having a recess out of the paths of relative movement of bowl rim portions and the cover, braking means mounted to move on the cover under action of gravity into position for coaction with the agitator within said paths of relative movement, or to be moved, by engagement of a portion of the bowl with said braking means, into said recess for the relative tilting of the bowl and cover, and adjustable stop means on said cover, against which said braking means moves under the gravitational action, whereby said braking means is held in different operative positions relative to the agitator.

8. In a dough mixer, a bowl and a cover for the bowl relatively to which the bowl is tiltable into and out of mixing position, and against portions of which respective rim portions of the bowl abut when the bowl is in mixing position, said cover portions being disposed substantially across the line of tilting movement of the respective rim portions, with their abutment surfaces facing in the direction of recession of the bowl rim portions therefrom, an agitator in said bowl, and braking means mounted on said cover for movement into position for coacting with the agitator, across the line of tilting movement of a rim portion, or for movement away from said line of tilting movement for tilting of the bowl.

9. In a dough mixer, a relatively tiltable bowl and cover, an agitator in the bowl, said cover having a recess out of the paths of relative movement of bowl rim portions and the cover, and braking means movable on the cover into position for coaction with the agitator within said paths of relative movement, or into said recess for the relative tilting of the bowl and cover, said cover having portions against which respective rim portions of the bowl abut when the bowl and cover are in their relative positions for mixing operation, and said rim portions extending across the lines of relative tilting movement of said rim portions with their abutment surfaces facing in the direction of relative recession of the bowl rim portions therefrom.

10. In a dough mixer, a bowl and a cover therefor, the bowl being pivotally mounted to tilt into and out of operative position, and the cover having portions abutting corresponding bowl rim portions when the bowl is tilted into operative position, said cover portions having their abutting surfaces facing in the direction of swinging of the bowl rim portions away from the cover, at relativtly low angles to the arcs of swinging of the respective bowl rim portions, said bowl rim and cover being arched upwardly from one side to the other along the arcs of swinging, an agitator in the bowl, and braking means pivoted on the inner side of the cover to swing into position for coaction with the agitator within said paths of relative movement, or to swing within the space left by arching the cover, out of the path of swinging of a side of the tilting bowl.

11. In a dough mixer, a forwardly and rearwardly tilting bowl, and a fixed cover slanting rearwardly, the rim of the bowl being shaped to move into and out of abutting relation to the cover at a relatively low angle thereto as the bowl is tilted in one direction or the other, an agitator rotatable on an axis transverse to the direction of tilting, in the bowl, said cover being arched away from said agitator, braking means comprising a brake member normally adjacent to the path of rotation of said agitator, and a support extension from said brake member with an end portion pivoted to the cover to swing in the plane of tilting, whereby the extension and the brake member may be swung into space left by arching the cover, said brake member and extension when in said space being out of the paths of swinging of the bowl rim portions.

12. In a dough mixer, a relatively tilting bowl and cover, an agitator in the bowl, said cover having a recess out of the path of relative movement of a bowl rim portion and cover, braking means movable on the cover into operative position for coaction with the agitator within said paths of relative movement, or into said recess, elements deriving a relative movement from the relative tilting of the bowl and cover, mutually engaging upon the relative tilting whereby said braking means is moved into said recess, means releasably engaging said braking means to hold it in said recess after said element pass out of mutual engagement in a latter stage of relative tilting, and an element with which the braking means is movable, engaged by a portion moving with the bowl on return of the bowl from its tilted position, whereby the braking means is released from the releasably engaging means for return to its operative position.

13. In a dough mixer, a relatively tilting bowl and cover, an agitator in the bowl, braking means movable on the cover into or out of a normal operative position for coaction with the agitator, and engaged by said bowl portion whereby said braking means is moved by said bowl portion out of its normal position upon relative tilting of the bowl and cover, means releasably engaging said braking means to hold out of normal position in a latter stage of relative tilting of the bowl and cover, and an engaging element on the braking means, engaged by said bowl portion on return relative tilting of the bowl and cover, whereby the braking means is released from the releasably engaging means for return to its normal position.

14. In a dough mixer, a bowl, a cover for the bowl comprising relatively movable sections one of which closes or opens the bowl accordingly as it is in or out of a normal position, an agitator in the bowl, braking means movable on the other cover section into or out of a normal position in which it coacts with the agitator, said bowl and said cover being relatively tiltable, and the one cover section and the braking means being engageable by respective bowl portions to be moved out of their normal positions upon relative tilting of the bowl and cover, releasable engaging devices, respectively, for holding the one cover section and the braking means out of their normal positions in a latter stage of relative tilting of the bowl and cover, and means movable with said one cover section and the braking means, respectively, engageable by respective bowl portions on return relative tilting of the bowl and cover, for release of said one cover section and the braking means from their engaging devices for return of said one cover section and the braking means to their normal positions.

EDWARD J. LAUTERBUR.